United States Patent [19]

Sandroni

[11] Patent Number: 4,517,819
[45] Date of Patent: May 21, 1985

[54] METHOD AND APPARATUS FOR FORGING SPROCKET SEGMENTS

[75] Inventor: Gianni Sandroni, Sumirago, Italy

[73] Assignee: Caterpillar Tractor Co., Peoria, Ill.

[21] Appl. No.: 446,819

[22] Filed: Dec. 3, 1982

[30] Foreign Application Priority Data

Oct. 9, 1981 [IT] Italy ............................. 83647 A/81

[51] Int. Cl.³ ............................................. B21D 22/00
[52] U.S. Cl. ....................................... 72/353; 72/342; 72/356; 29/159.2
[58] Field of Search ................ 72/353, 342, 356, 364, 72/358, 360; 29/159.2

[56] References Cited

U.S. PATENT DOCUMENTS

| | | | |
|---|---|---|---|
| 3,895,422 | 7/1975 | Graafsma | 29/159.2 |
| 4,253,323 | 3/1981 | Murkami | 29/159.2 |
| 4,254,540 | 3/1981 | Bilah | 29/159.2 |
| 4,420,962 | 12/1983 | Peterson | 29/159.2 |

*Primary Examiner*—Leon Gilden

*Attorney, Agent, or Firm*—Robert A. McFall

[57] ABSTRACT

The invention discloses a process of forging a sprocket segment for a track-type vehicle undercarriage. The forging process produces sprocket segments that conform to very restrictive tolerances without the necessity of additional machining or finishing.

The process includes heating a metal billet (5') in an electric furnace (60), rough-shaping the billet (5'), then forging the billet (5') in a die (62) to form a sprocket segment (5) having a size and shape substantially equal to the desired finished shape of the segment (51). The forged sprocket segment (5) is trimmed and then placed in a coining die (8) wherein at least two nonparallel surfaces (A,B,C) are formed to a desired finished dimension.

The invention also includes an apparatus (8) for forging a sprocket segment to a desired finished dimension. The apparatus (8) includes an upper die member (80), a lower die member (8'), and a transversely-moveable die member (82).

9 Claims, 20 Drawing Figures

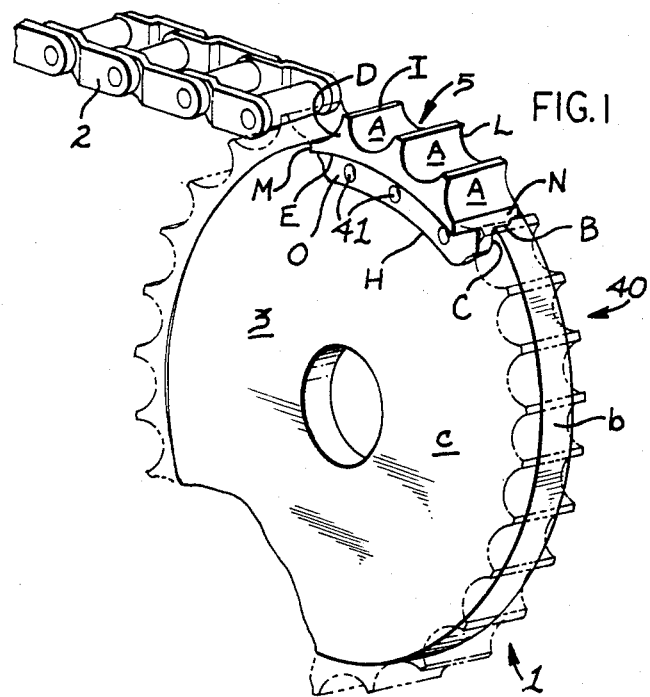
FIG. 1
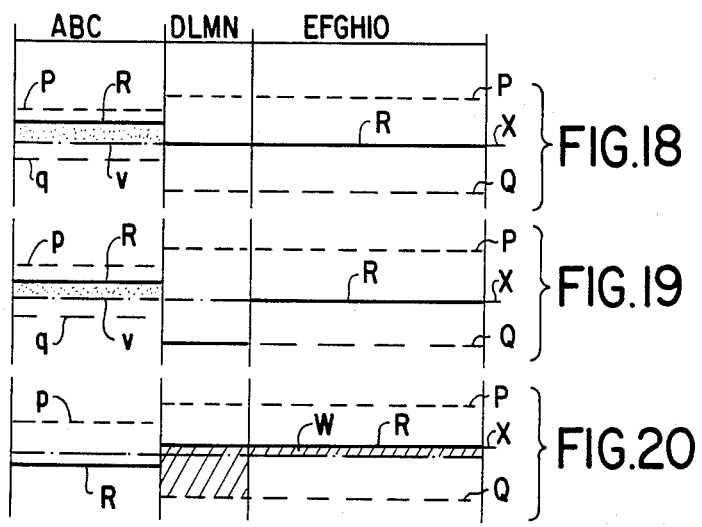
FIG. 18
FIG. 19
FIG. 20

U.S. Patent May 21, 1985 Sheet 2 of 3 4,517,819
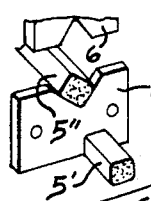
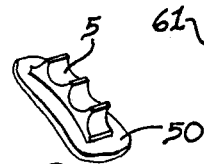
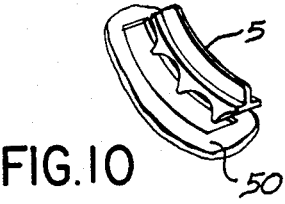
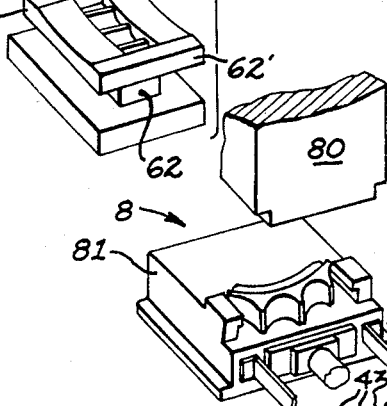
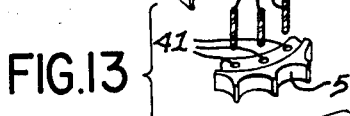
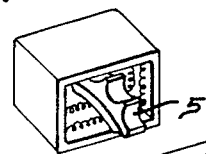
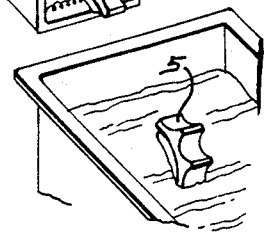

METHOD AND APPARATUS FOR FORGING SPROCKET SEGMENTS

TECHNICAL FIELD

This invention relates generally to a process and apparatus for forging sprocket wheel segments and more particularly to a method and apparatus for forging sprocket segments to finished dimensions without subsequent machining of mounting and link contact surfaces on the segment.

BACKGROUND ART

The driving wheels of tracked vehicles have a plurality of teeth formed on a radially outer part of the wheel. More, recently, the track-engaging portion of the drive wheels have been formed as separate members each including a number of teeth with each of the members mounted on a flanged ring. The teeth in the segments have undercut surfaces that heretofore have been machined or flame cut to the required close-toleranced final dimension. On these segments, or better on their surfaces, a machining allowance thickness of about 3 mm is provided and 1.5 mm limits of clearance are provided to comprise a final allowance between 1.5 mm and 4.5 mm. Machining of this forged segment is extremely laborious, very expensive, and adverse results are often obtained.

The present invention is directed to overcoming and on more of the problems set forth above in addition to offering several new advantages. The inventor has found a manufacturing procedure and forging means that give a forging perfect shape and dimensions, that is to say, within the tolerance limits that are to be kept not for the forging operations but for the machining operation. In order to achieve these results, the inventor has looked at the different tolerances and has made an ideal discrimination between shapes and surfaces that have greater degrees of tolerance and forms and surfaces that have very restricted tolerances, in order to place the operations of coining on the surfaces with restricted tolerances, letting the excess of material to be located on the surfaces where greater tolerances are allowed. Following this theoretical discrimination there has corresponded the development of a coining die for forming surfaces on two planes at right angles with respect to each other and in the same phase, which allows on to coin the surfaces and move material from one surface to the other, according to a preset balance.

This is a coining or minting process that surpasses in all respects the concept of finishing with machine tools. In fact, the concept of finishing with machine tools is that of (taking the route of) removal of excess metal and its elimination under the form of shavings, a method which involves a destruction of the better part of the forging with the cutting of the forges surface and the exposure of open grains of the metal.

The present invention, instead, uses the excess material on certain surface and the deficiency of material on other surfaces for mutual compensation, leaving the eventual final excess or deficiency on the surfaces that can stand greater tolerances. That is to say that during the single phase of coining, all the surfaces within a restricted tolerance, none of them excluded, are matched by the coining surfaces and all the surfaces with larger margins of tolerance are left free to take up the excess and deficiencies resulting from the structuring brought about by the minting or coining process. In this way the forged metal flow lines and grains of the metal are left intact and the same surfaces of the forging present an outer layer which is tougher and more porous and, therefore, much better adapted to keep lubricants and to bear the mechanical wear and oxidation than those surfaces finished by machine tools. It must be taken into account that, because of the complex form of the segment and the different dislocation of the surfaces to be finished by machining, the previous process had to be carried out on two tool machines with processes of relatively complexity.

DISCLOSURE OF THE INVENTION

In accordance with one aspect of the present invention, a method of forging a sprocket segment for a track-type undercarriage includes the steps of heating a metal billet having a predetermined mass, pressing the billet in an open press to form a rough-shaped blank, forging the blank in a die to form a sprocket segment having a size and shape substantially equal to the desired finished shape of the segment, trimming the forged segment, and simultaneously coining at least two non-parallel surfaces of the segment to form the two surfaces to a desired finished shape and dimension.

In accordance with another aspect of the present invention, an apparatus for forging a track-type undercarriage sprocket segment to a desired finished dimension includes a lower and an upper die member, and a third die member having a workpiece-contacting surface defining, in cooperation with the upper and lower die members, a closed die cavity. The third die member is transversely moveable with respect to the upper and lower die members.

BRIEF DESCRIPTION OF THE DRAWINGS

FIG. 1 is a perspective view of a driving wheel for tracks, for example, of an earthmoving machine, where are clearly represented a sprocket segment, a mounting flange and a track length.

FIG. 2 is a perspective view of the first step in the method according to one embodiment of the presention invention.

FIG. 3 is a perspective view showing the result of the first working step.

FIG. 4 is a perspective view showing the second process step.

FIG. 5 is a perspective view of a pair of rough shaping dies used in the third process step.

FIG. 6 is a perspective view showing the rough-shaped workpiece obtained in the third process step of FIG. 5.

FIG. 7 is a perspective view showing a forging die used in the fourth process step.

FIG. 8 is a perspective view showing the result of fourth process step shown in FIG. 7.

FIG. 9 is a perspective view of a trimming and extruding die used in the fifth process step according to an embodiment of the present invention.

FIG. 10 is a perspective view showing the result of fifth process step as shown in FIG. 9.

FIG. 11 is a perspective view showing a coining die used in the sixth step of the process according to an embodiment of the present invention.

FIG. 12 is a perspective view showing the sprocket segment obtained from the sixth step of process as shown in FIG. 11.

FIG. 13 is a perspective view illustrating the drilling process of the seventh process step.

FIG. 14 and FIG. 15 are perspective views showing the eighth process step.

FIG. 18, FIG. 19, and FIG. 20 are symbolic diagrams showing metal transfer taking place within respective tolerance fields during die forging, trimming and coining.

BEST MODE FOR CARRYING OUT THE INVENTION

Figure 16:
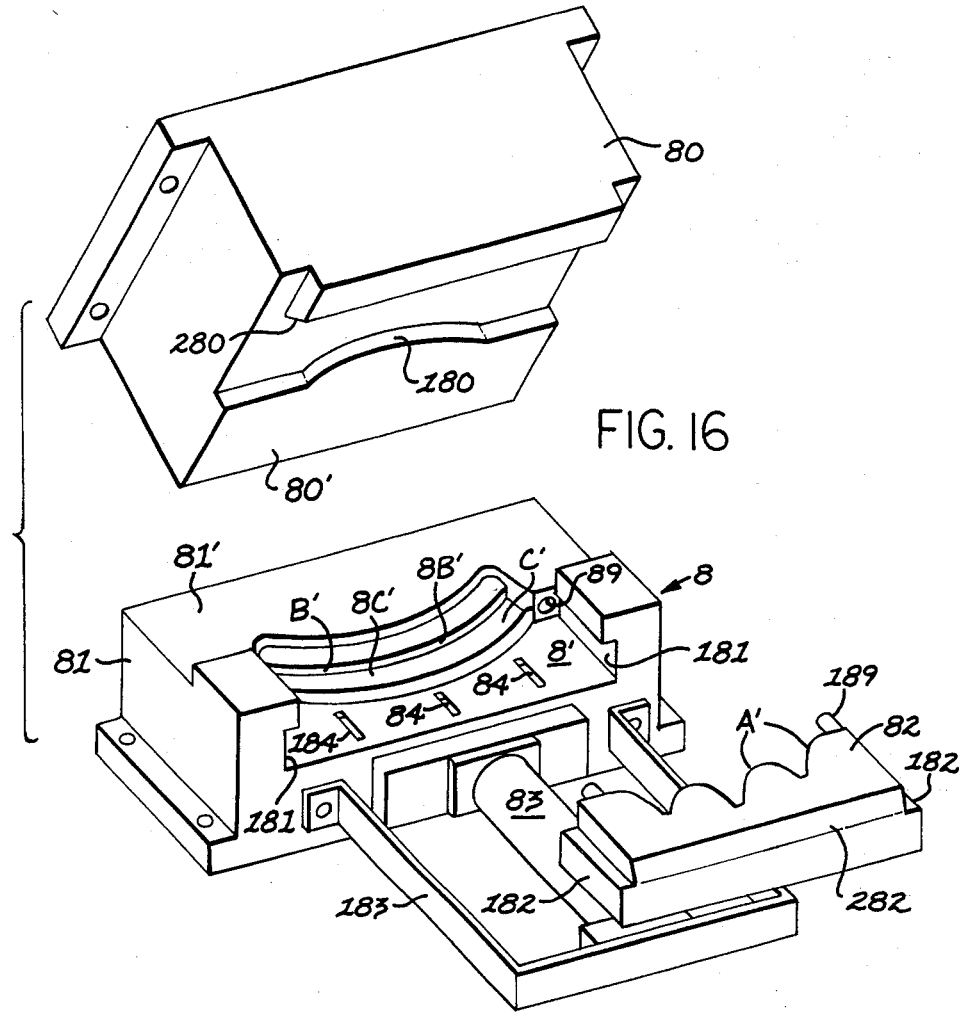
FIG. 16 is a partially exploded perspective view of the coining die of FIG. 11.

With reference to FIG. 1 of the drawings, a driving wheel 1 of a tractor undercarriage track 2 conventionally includes a disc of flange 3 and a sprocket 40 comprising a number of sprocket segments 5 each having three teeth connected to the flange 3; e.g., by bolts (not shown). As shown in FIG. 1, the assembly comprising the segments 5 on the flange 3, provides a sprocket wheel for the track or chain 2 with teeth well centered on the axle of the wheel with tolerances within a range of 0.15 mm to 0.35 mm. The shapes and sizes which are to be kept within such tolerance limits are only those of parts which engage the chain 2 from one side and the flange 3 from the other side. More particularly, such surfaces comprise the concavities A of the teeth, a segment of the cylindrical surface B which must be within prescribed tolerance limits with reference to the surface A as well as with reference to a hypothetical center of the segment and therefore of the wheel and the surface b of the wheel 3. The other surface that has limits of restricted tolerances is the frontal radial surface c of the wheel 3.

Conventionally, the surfaces A, B and C of the segment 5 are initially formed with a machining allowance thickness of about 3 mm with tolerance limits of ±1.5 mm. The machining allowance is taken off by tool machining. In fact, the surfaces A are now milled and the surfaces B and C are now turned on a lathe. In both machining operations, difficulties are encountered in locating the segment to be worked in that the use of fixtures can be impaired by non-uniformity of the forged segment even if the segment is within the above-described tolerance limits for machining allowances at the surfaces A, B and C.

According to the preferred embodiment of the present invention, the sprocket segment 5 is formed by the method and apparatus as shown in FIGS. 2 through 17 of the drawings wherein surfaces A, B and C are maintained within tolerance limits so that the sole metal tool working required is drilling or punching of the bolt holes. The first step of the process according to the present invention (FIG. 2) comprises shearing a billet 5' from a length of barstock 5" with a shear 6. The billet 5', as shown in FIG. 3, is cut to a predetermined length such that the billet 5' has a mass exactly corresponding with the mass of the final sprocket segment 5 plus the conventional flash formed during an initial forging operation and the material removed from the punched holes. The second step of process (FIG. 4) comprises heating the billet 5' in an electric induction furnace 60. Once heated the billet 5' is submitted to a rough shaping operation (FIG. 5) by pressing the billet 5' in an open press, comprising the third step of the process, to provide a rough-shaped blank 5', as shown in FIG. 6.

The fourth step of the process (FIG. 7) comprises forging the billet 5' in a die 61 having a radial opening in a bottom die half and having teeth on the underneath side of an upper die half. The step of forging in the present invention takes place substantially in a conventional way but with shapes and sizes formed within very close tolerance limits and a flash 50 as shown in FIG. 8 connected to the base of the forged segment 5.

An initial verification or check of the final shape and dimension takes place in the fifth step of the process (FIG. 9) wherein the forged segments 5, including flash 50, are turned upside down with regard to the fourth step disposition. The die is drawn across the forged segment and the flash 50 is trimmed from the segment 5. In this operation, the segment teeth are placed on a bottom matching support provided by an anvil die half 62' of a die 62. Even though the trimming and drawing step does not change any of the surfaces to be kept within the restricted tolerance limits, it always represents a successive approximation to the optimal shape and dimensions that precede the final verification comprising the multiple coining of the next step. The result of trimming is shown as separated flash 50 in FIG. 10.

In the next step (FIGS. 11, 16 and 17) the sprocket segment 5 undertakes an important single-step operation of multiple coining, during which the segment surfaces A, B and C are mated respectively with corresponding surfaces A', B' and C' of an apparatus or die 8, to be more fully described later in the specification. After coining, the sprocket segment 5 is drilled (FIG. 13) with the drills 43 to form the holes 41. Preferably, it is convenient to provide drilling when the segment metal is still hot from the preceding forming operations. However, in the next step (FIG. 14), the temperature of the segment 5 is increased to a suitable value for heat treatment and in the following step (FIG. 15) the segment 5 is cooled to a suitable quench temperature.

Figure 17:
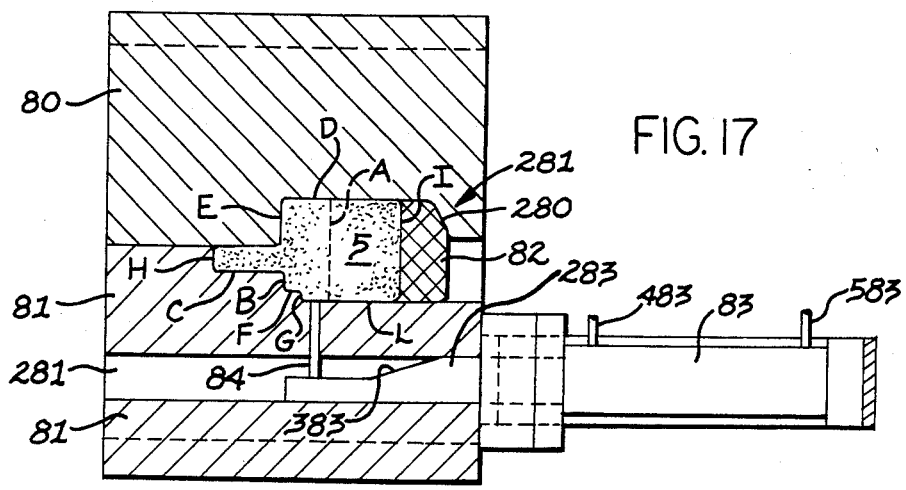
FIG. 17 is a cross-sectional view of the closed die shown in FIG. 11 and FIG. 16, and contains the sprocket segment being coined.

The advantages of the present invention are substantially provided by using an apparatus such as the multiple coining die shown in FIGS. 11, 16 and 17. The die 8 includes an upper die member 80, a lower die member 81, a horizontally or transversely moveable third die member 82, a piston cylinder unit 83 and a plurality of ejectors 84. The bottom or lower die member 81 is fastened to the anvil of a press, not shown, and includes a substantially parallelepiped body made of steel and having a stepped upper wall providing three arched steps 8B', 8C' and 8'. Moreover, the body 81 is provided with a pair of grooves 181 for slidably guiding the transversely moveable member 82 which, in turn, is provided with corresponding guides 182. The piston cylinder unit 83 is mounted by a bracket 183 on the bottom die member 81. An outer end 383 of a piston 283 is provided with an inclined end surface which projects into a horizontally disposed chamber 281 included in the lower die member 81. At right angles relative to the chamber 281, a plurality of slots 184 are provided for slidably receiving a plurality of ejectors 84. A transverse or horizontally-directed stroke movement of the piston 283 of the unit 83 provides for lifting and lowering of the ejectors 84. Operation of the piston 83 is provided by directing a supply of pressurized fluid to a respective one of the ports 483 and 583 on the body of the cylinder unit 83. The member 82 with its own guides 182 is placed free to move for a short distance within the guides 181, and has an inclined plane 282 on one side and a shaped surface A' on the opposited side corresponding to the surface A of the segment teeth. More specifically, the shaped workpiece-contacting surface A' includes a plurality of covex surfaces A', each of which form one of the corresponding concave surfaces A on the sprocket segment 5.

The upper die half 80 is fastened to a press ram, not shown, and includes a parallelepiped bottom wall 80' having an arched step 180 and an inclined plane step 280. The inclined plane step 280 engages an inclined plane surface 282 of the transversely moveable member 82, as shown in FIG. 17 and forms a means 281 for maintaining the transversely moveable third die member 82 in a closed, predetermined relationship with respect to the upper and lower die members 80, 81 in response to moving the upper die member 80 into contact with the third die member 82. When the die halves are mounted on a press, they are substantially arranged as shown in FIG. 11. The trimmed segment 5 (FIG. 10) obtained with the die of FIG. 9 is inserted in the cavity of the lower die half 81 with the transversely moveable member 82 in contact with the toothed portion of the segment 5, as shown in FIG. 11. The die upper half 80 is lowered until the bottom surface 80' contacts the upper surface 81' of lower die half 81 and vertical coining of the segment 5 is provided. The verticle coining operation fixes the dimensions of the horizontal surface C, as shown in FIG. 17. At the same time, the surface 280 of the upper die half engages the surface 282 of the moveable member 82, forcing the vertical surfaces A' of the moveable member 82 against corresponding surfaces A of the segment 5. Consequently, the surface B of the segment 5 is forced into contact with the corresponding surface B' of the lower die member 81, providing a horizontal coining of upright surfaces A and B on the segment. It will be appreciated that the die arrangement and operation are such that coining of surfaces A, B and C may be effected with due accuracy with respect to angular and dimensional relationships and the excess material from these surfaces can be transferred to other surfaces; e.g., D, E, F, G, H, I, L, M, N, O. Once the sprocket segment has been formed to the desired first shape and size, the die 8 is opened and the segment 5 remains in the lower die half due to the absence of any draft or taper on the closely controlled tolerance surfaces A, B and C. At this stage, the piston of unit 83 is set into operation with inward movement of the piston 283 which, with its inclined plane 383, lifts ejectors 84 and consequently the finished segment 5. This ejection also provides for the translation of the moveable member 82 in a direction away from the formed segment 5. To aid in the translation of the moveable member 82, a pair of springs (not shown) are mounted in a corresponding pair of holes 89 which also respectively receive a pair of guide rods 189.

Best Mode For Carrying Out The Invention

In one example of a sprocket segment made according to the method and apparatus of the present invention, the segment 5 has three teeth, an outer radius of about 400 mm to about 500 mm, and a mass of about 4 kg to about 12 kg. The tolerance limits required for a typical segment of this size are as follows: ±0.7 mm; i.e., ±0.35 mm for the die forging step and about 0.5 mm; i.e., ±0.25 mm for the trimming and about ±0.20 mm for the coining operation. These tolerance limits for parallel, opposed surfaces; e.g., surfaces A and B are reduced to half of the above tolerances.

To obtain the tolerances within the strict limits required for surfaces A, B and C and less restrictively for the surfaces D, E, F, G, H, I, L, M, N and O according to the present invention, it is necessary that the mass, shape and size of the metal body being worked and the shape and size of the die be arranged as follows: The cavity of the forging die 61 (FIG. 7) should have, not considering shrinkage, a size corresponding to the upper tolerance limits at each of the cavity surfaces corresponding to segment surface A, B and C and at nominal values for surfaces D, E, F, G, H, I, L, M, N and O. The trimming and drawing die 62 should have a profile or drawing surface for surfaces D, L, M, N, substantially close to the lower tolerance limit. The coining die 8 should, when closed, and including the horizontally moveable member 82, provide a cavity corresponding to the surfaces A, B and C at the lower tolerance limit, and at the maximum tolerance limit with respect to surfaces D, E, F, G, H, I, L, M, N and O.

The lowest tolerance limit with reference to the strictly toleranced surfaces A, B and C and the highest tolerance limits with reference to the less strictly toleranced surfaces, D, E, F, G, H, I, L, M, N and O provide a metal "flow" which is extremely reduced but sufficient for transfer material from the surfaces restricted to the lower tolerance limits. It will be appreciated that when the die 8 is closed, its cavity provides the minimum side of the tolerance range and will produce pieces of excess size when the die 8 is not completely closed and/or if the die is excessively worn. In fact, a possible material shortage is not taken into consideration since during forging and trimming material in the respective dies is always in excess of the amount required. Excess material is not even taken into consideration because any excess material is maintained only on the strictly toleranced surfaces whose wear life is less than that of the higher toleranced surfaces and consequently may receive more material transferred from the former, while even the dies in poor condition a very small excess quantity should be left between the nominal rated size and the lowest tolerance limit.

On the other end, the transfer of small material quantities of material does not form flash because the material being transferred will find the necessary residence space within the cavity of the die. The aforesaid tolerance arrangement is symbolically shown in FIGS. 18, 19 and 20. FIG. 18 is referred to forging (FIG. 7), FIG. 19 is referred to trimming (FIG. 9) and FIG. 20 to coining (FIG. 11). In these three diagrams with three fields are shown VIZ: the Field ABC representing segment surfaces A, B and C with a strict tolerance: The field DLMN representing segment surfaces D, L, M and N; i.e., one part of surfaces that have a higher tolerance and more particularly the surfaces involved in the trimming operation (FIG. 9), the field EFGHIO representing segment surfaces E, F, G, H, I and O; i.e., another part of the segment surfaces have a higher tolerance band. In each of the graphs a line is shown representing a tolerance field; a line P representing the highest limit of a less strictly toleranced field, a line p representing the highest value of a strictly toleranced field, a line q representing the lower limit line of a strictly toleranced field, a line Q representing the lower limit of a less strict tolerance, and the rated value R by line X. Moreover, dotted areas V represent output areas and W are input areas. Thus, during forging (FIG. 19) in areas A, B and C, there is an excess of material V, while on surfaces D, E, F, G, H, I, L, M, N and O there is a rated condition. In the trimming and drawing phase, because we work only on the surfaces D, L, M and N, in other words, in the field DLMN, the other fields ABC and EFGHIO are kept the same, but we only take away some material in the field DLMN (FIG. 19).

Finally, during coining, material V "flows" from field ABC to fields DLMN and EFGHIO, more particularly it fills field DLMN and increases it to a higher level than field EFGHIO. The aforesaid diagram shows that material transfer takes place well within highest and lowest tolerance limits both narrow and wide and even if, in practice, the optimal size can not be obtained there is still a reduced field for further operation. This advantage in a forging process is highly appreciated as some conditions such as temperature and die wear are difficult to control. Since the invention has been described and shown merely by way of example and not restrictively, it is self-evident that numerous modifications can be made to its whole and to its details, without departing from the spirit of the invention as defined by the appended claims.

I claim:

1. A method of forging a sprocket segment (5) for a track-type vehicle undercarriage, including the steps of:
   heating a metal billet (5′) having a predetermined mass;
   pressing said billet (5′) in an open press to form a rough-shaped blank (5′);
   forging said blank (5′) in a die (61) having predetermined dimensions and thereby forming a sprocket segment (5) having a size and shape substantially equal to the desired finished shape of the segment (5);
   trimming said forged segment (5); and
   applying external forces to the forged segment from at least three different directions to simultaneously coin at least two nonparallel surfaces (A,B,C) of said forged segment (5) and to thereby form said surfaces (A,B,C) to a desired finished shape and dimension.

2. A method, as set forth in claim 1, wherein the step of simultaneously coining at least two nonparallel surfaces (A,B,C) includes coining a third surface (A,B,C) substantially parallel to one of said nonparallel surfaces.

3. A method, as set forth in claim 1, including the additional steps of:

forming a plurality of holes (41) in said segment (5) subsequent to the step of coining; and heat treating said segment (5).

4. A method, as set forth in claim 1, wherein the step of simultaneously coining at least two nonparallel surfaces (A and B or C) includes coining said surfaces substantially orthogonally with respect to each other.

5. An apparatus (8) for forging a track-type undercarriage sprocket segment (5) to a desired finished dimension, said apparatus (8) having an upper die member (80) and a lower die member (81) each of said members (80,81) at least partially defining a die cavity, said upper and lower die members (80,81) being movable in one direction toward and away from each other, the improvement comprising:
   a third die member (82) having a workpiece-contacting surface (A′) defining a portion of said die cavity,
   means for simultaneously moving said third die member (82) in a direction transverse to said one direction in response to said respective movement of said upper and lower die members (80,81), and
   said workpiece-contacting surface (A′) defining a closed die cavity in cooperation with said upper and lower die members (80,81) when said third die member (82) is in a closed position.

6. The apparatus (8), as set forth in claim 5, wherein said apparatus (8) includes means (281) for maintaining said third die member (82) in a closed, predetermined relationship with respect to the upper and lower die members (80,81) in response to moving said upper die member (80) into contact with said third die member (82).

7. The apparatus (8), as set forth in claim 6, wherein said means (281) for maintaining said third die member (82) in the defined relationship includes an inclined surface (282) on the third die member (82) and a mating inclined surface (280) on said upper die member (80).

8. The apparatus, as set forth in claim 5, wherein the workpiece-contacting surface (A′) of said third die member (82) includes a plurality of convex surfaces (A′), each of said convex surfaces (A′) being of a construction sufficient for forming a corresponding concave surface (A) on an outer surface of said sprocket segment (5).

9. The apparatus, as set forth in claim 8, wherein the convex surfaces (A′) are at least three in number.

* * * * *